United States Patent [19]

Alderfer et al.

[11] 4,115,048

[45] Sep. 19, 1978

[54] APPARATUS FOR INTERNALLY COOLING A PLASTIC TUBULAR FILM BUBBLE

[75] Inventors: Richard Bernhard Alderfer, Glastonbury, Conn.; Gerald Harry Scheibner, Downers Grove, Ill.

[73] Assignee: Union Carbide Corporation, New York, N.Y.

[21] Appl. No.: 754,529

[22] Filed: Dec. 27, 1976

[51] Int. Cl.² ............................................. B29D 23/04
[52] U.S. Cl. ................... 425/72 R; 264/95; 264/209; 425/326.1; 425/308; 425/404; 425/466
[58] Field of Search ............... 264/95, 209; 425/72 R, 425/308, 326 R, 466, 387 R, 404, 325

[56] References Cited

U.S. PATENT DOCUMENTS

| | | | |
|---|---|---|---|
| 2,966,700 | 1/1961 | Dyer et al. | 425/326 X |
| 3,265,552 | 8/1966 | Berggren et al. | 264/95 X |
| 3,749,540 | 7/1973 | Upmeier | 425/72 X |
| 3,871,802 | 3/1975 | Blackwelder | 425/72 |
| 3,976,411 | 8/1976 | Rahles et al. | 425/72 R |
| 4,049,768 | 9/1977 | Luthra | 425/72 R X |

Primary Examiner—Francis S. Husar
Assistant Examiner—Mark Rosenbaum
Attorney, Agent, or Firm—Clement J. Vicari

[57] ABSTRACT

An apparatus and method for internally cooling extruded tubular film produced from film-forming polymers such as polyethylene, polypropylene and the like.

37 Claims, 6 Drawing Figures

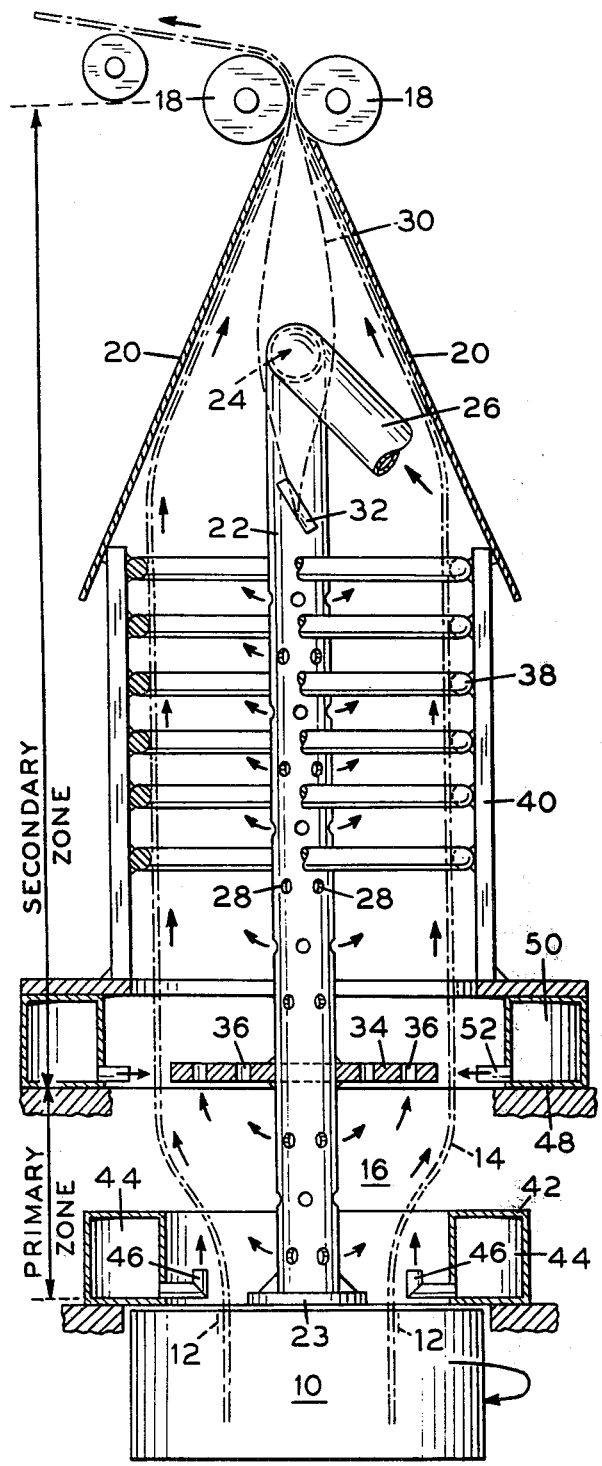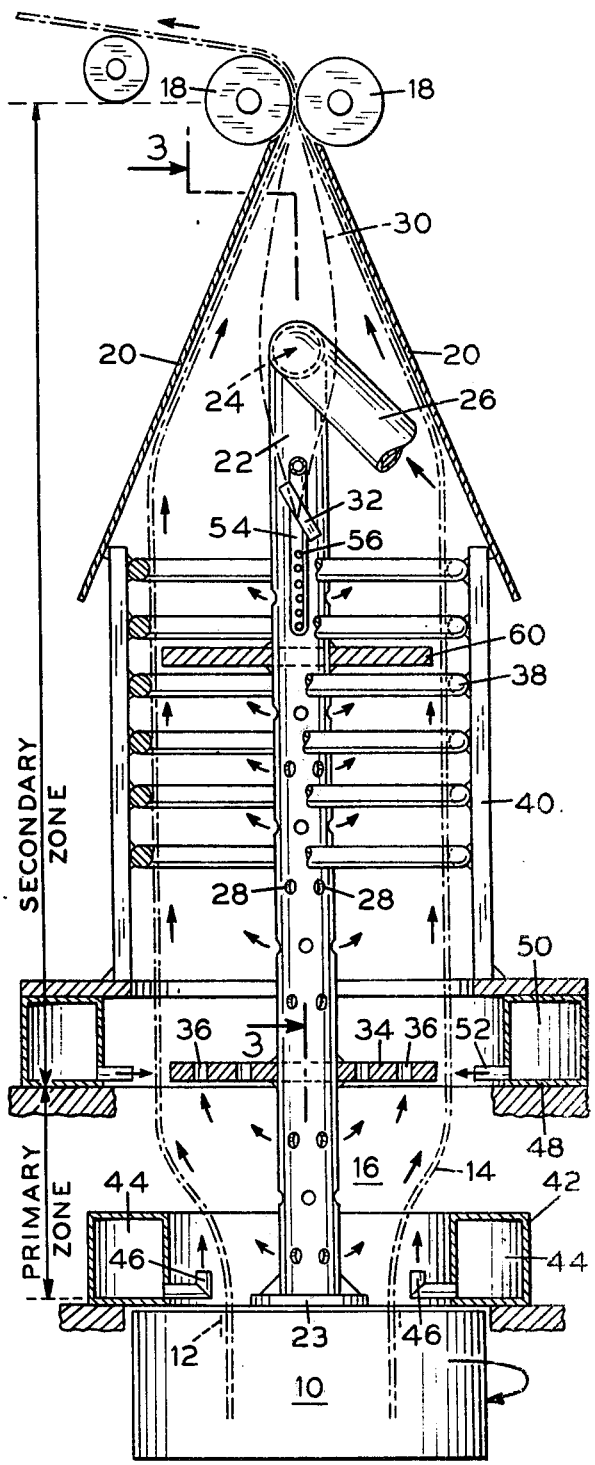

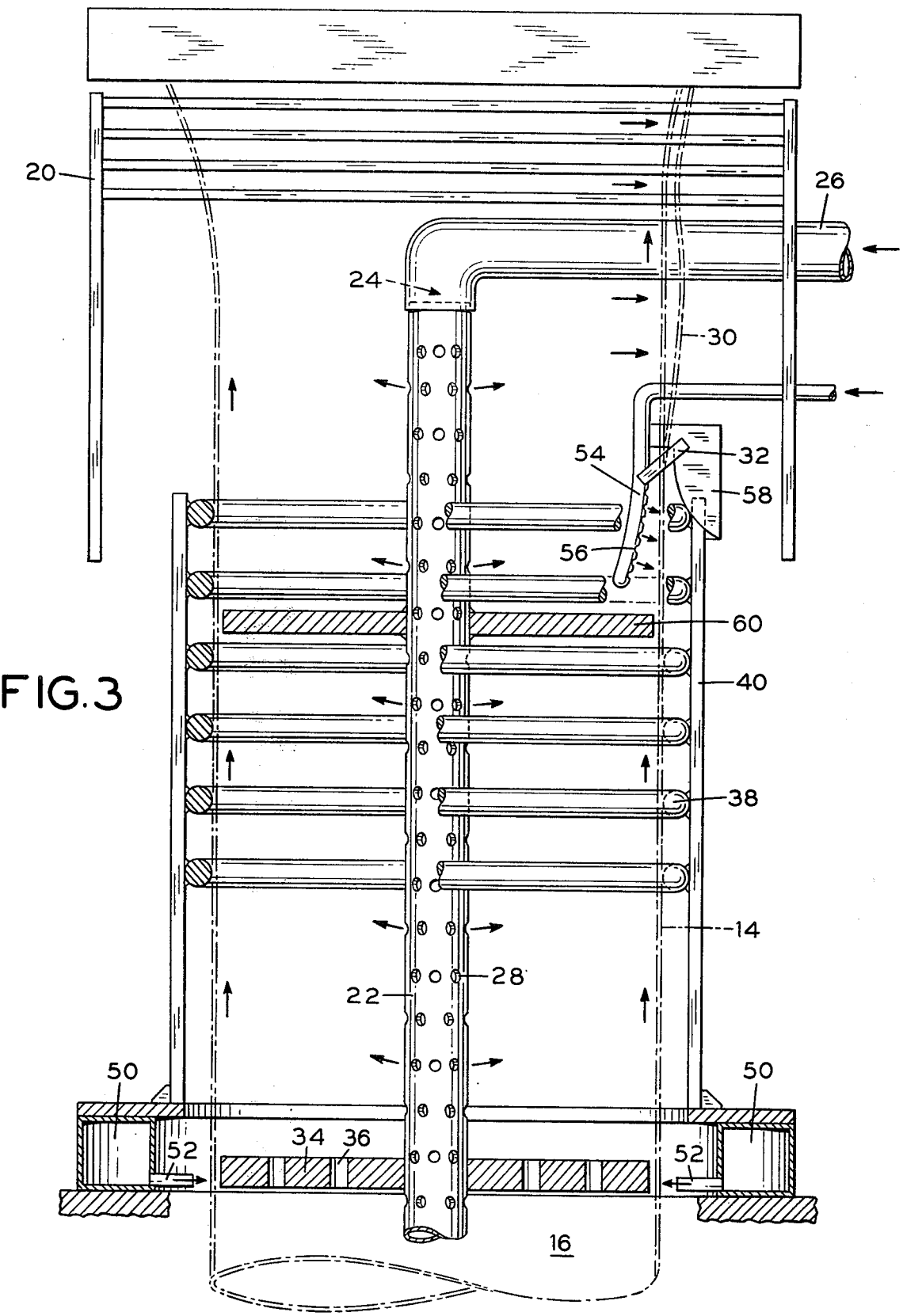

APPARATUS FOR INTERNALLY COOLING A PLASTIC TUBULAR FILM BUBBLE

The present invention relates to an apparatus for producing film from thermoplastic resinous materials. In a more specific aspect, the present invention relates to an apparatus for internally cooling extruded tubular film produced from film-forming polymers such as polyethylene, polypropylene and the like.

Under conventional techniques for forming tubular film suitable for fabrication of bags and the like, a film forming polymer, such as polyethylene is extruded through an annular die arranged in an extrusion head so as to form a tube having a smaller outer diameter than the intended diameter of the eventually produced film tube. The film tube withdrawn from the extruder is directed through flattening means such as a collapsing frame and a pair of rollers, which flattens the extruded film tube. Between the point of extrusion and the terminus of the flattening means, the tubing is inflated to a predetermined diameter by means of air or other gaseous medium to form a gaseous bubble. Cooling of the inflated tubing has heretofore been achieved by internal or external cooling of the bubble or both. In general, procedures which relied entirely on external cooling of the film bubble were not entirely satisfactory because of the limited output rate (lbs/hr/inch of die lip circumference) due primarily to external air cooling limitations. Normally, the air inside the bubble cannot escape and contributes very little to the cooling rate. Once the critical external cooling air volume/velocity is reached, further increases cause rapid deterioration in bubble stability.

As a result, the art has concentrated on techniques for cooling the bubble internally as well as externally. In general, internal bubble cooling is typically accomplished by three primary cooling modes, i.e., a chilled (such as by water cooling) mandrel which sizes the bubble, an internal air conditioner cooling a fixed volume of air, and a single pass air circulation system.

U.S. Pat. Nos. 2,720,680; 3,061,875 and 3,304,352 are representative patents dealing with internal cooling of a film bubble by utilization of a chilled internal mandrel. According to the techniques disclosed in these patents, the bulk of the bubble cooling is effected by the mandrel because of its very high heat transfer coefficient. The internally disposed mandrel controls the final diameter of the film tube. Thus, a given size mandrel is limited to one flatwidth.

An internal bubble air conditioner is described in U.S. Pat. No. 3,445,891. The device disclosed therein circulates trapped air over refrigeration coils and a baffle system with a fan. Condensate is collected and drained as necessary but unfortunately, however, effective cooling is limited by condensate build-up and the resulting relatively low overall heat transfer coefficient of the cooling system.

U.S. Pat. Nos. 3,709,290; 3,716,322; 3,749,540; and 3,768,949 are representative of techniques which utilize a single pass air circulation system for internally cooling a film bubble. In general, an externally mounted bubble diameter or flatwidth sensing system is relied upon to balance the in/out air supply blowers. Problems of condensate build-up are alleviated because the cooling air is used for only one pass.

As far as we are aware, all of the above described procedures utilize die passages to get coolant into and out of the film bubble, which is not desirable because the coolant generates thermal non-uniformities (depending on insulation efficiency but greater insulation thickness usually means less gas or liquid coolant throughput) in the die body which thereby results in more gauge variation. Moreover, the circulating cooling air is necessarily heated to some extent as it passes through the die. This results in less cooling efficiency due to a reduced temperature gradient between the film and coolant. Therefore, useful die passages are generally limited to larger die sizes.

In addition, because a fairly precise input/output air balance must be maintained to keep resulting flatwidth constant, excessive flatwidth variation is possible. Sophisticated bubble diameter or flatwidth measurement and feedback control systems are necessary for satisfactory process stability.

Finally, tubular film dies are usually rotated or oscillated in order to randomize transverse direction film gauge variations. This generates a logistic and a space problem with the hoses necessary for air supply and exhaust.

As is known to those skilled in the art, many types of articles fabricated from film do not require a closed tubular construction as starting material for their construction and, in fact, most film produced in tubular form is slit in at least one slitting operation. The slitting is usually accomplished subsequent to the flattening of the freshly extruded tubular film.

We have found that the internal surface of a freshly extruded tubular film can be effectively cooled and oriented without experiencing any of the above disadvantages of prior art techniques by directing a sufficient balanced supply of cooling fluid, such as air, directly into the film tube (i.e., without passing through the tube die body), by continuously slitting the film at or proximate the flattening means and introducing the cooling fluid through the formed slitted opening onto the interior surface of the film tube.

Therefore, the principal object of the present invention is to provide an improved apparatus for the preparation of film from thermoplastic resinous materials.

A further object of the invention is to facilitate the manufacture of a uniform high quality and regularly constant gauge (or thickness) film product.

Another object of the invention is to provide an apparatus for the manufacture of film in general accordance with the bubble process wherein difficulties due to inefficient and ineffective cooling prior to or simultaneous with orientation of the freshly extruded film tube might easily be avoided.

Another object is to provide an apparatus for producing film from thermoplastic materials, wherein the extruded film prior to take-up is slit and cooled by directing cooling fluid into the interior of the formed tubular film through the formed slitted opening.

These and other objects will be apparent from the following description taken in conjunction with the accompanying drawings in which:

FIG. 1 is a vertical elevation in section of one form of apparatus for manufacturing film according to the invention.

FIG. 2 is a view similar to FIG. 1 with an additional upper baffle plate added and showing a cooling means for cooling the zone of the advancing film wherein the slitting is to take place.

FIG. 3 is a vertical section taken generally along line 3—3 of FIG. 2.

Figure 4:
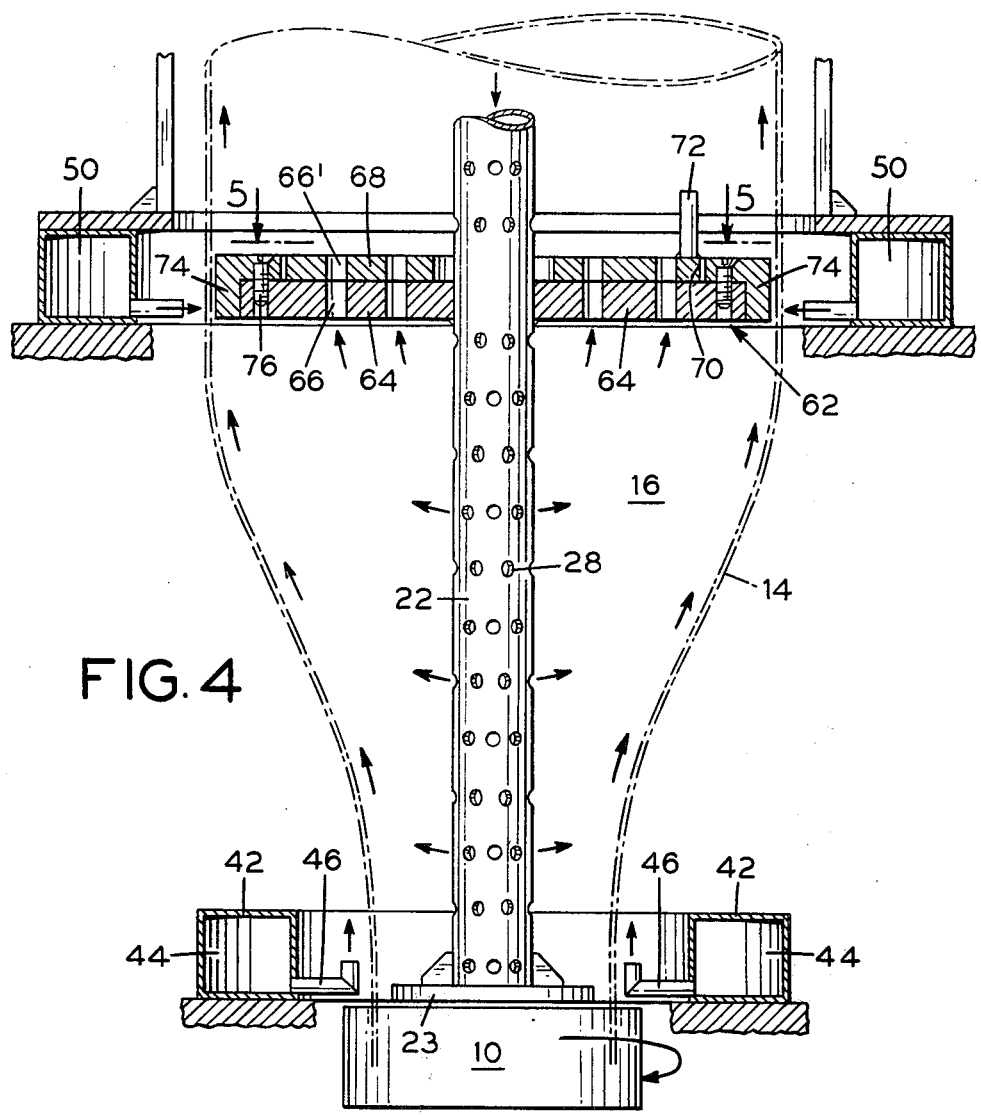
FIG. 4 is a vertical section showing another form of the lower portion of the apparatus of FIGS. 1 or 2 which is provided with an adjustable baffle plate assembly.

In accordance with the present invention there is provided an apparatus for manufacturing film from thermoplastic resinous film forming materials which comprises in cooperating combination:

(a) a tube die adapted to extrude a seamless film tube;

(b) flattening means positioned a distance from the die for flattening the extruded tube;

(c) a diffuser vertically disposed on the discharge side of the die in the space enveloped by the extruded film tube having a gaseous coolant inlet disposed in the inlet portion of the diffuser, the diffuser having means to deliver from its peripheral edge a gaseous coolant to the interior surface of the extruded film tube;

(d) film slitting means for continuously slitting the extruded film to provide at least one slitted opening in the extruded film;

(e) restrictor means associated with the diffuser defining a primary zone and a secondary zone of the extruded film and being adapted to maintain a pressure differential between the primary and secondary zone; and (f) means for communicating gaseous coolant through the slitted opening to the gaseous coolant inlet whereby gaseous coolant introduced to the diffuser through the gaseous coolant inlet continuously passes through the diffuser into the primary and secondary zone in contact with the interior surface of the tube and is continuously withdrawn through said slitted opening.

In a preferred embodiment, the primary zone of the apparatus is provided with means for maintaining film-gauge uniformity of the film such means including an internal air ring attached to the diffuser tube near its base. In addition, the apparatus is further provided with secondary restrictor means in the secondary zone and with secondary cooling means associated with the film slitter in the secondary zone for continuously cooling the area of film to be slit.

The present invention can be utilized in a method of producing film from a thermoplastic film-forming material which comprises:

(a) extruding a fused thermoplastic film-forming resin through an extrusion orifice in a tube die in the form of a seamless film tube;

(b) withdrawing the freshly extruded film tube away from the die and directing the film to a flattening means for flattening the extruded film;

(c) continuously slitting the film to provide at least one continuous slitted opening in the extruded film;

(d) continuously introducing a gaseous coolant through the slitted opening into the interior of the seamless tube, the gaseous coolant being directed along and against the interior surface of the tube; and (e) continuously withdrawing gaseous coolant from the interior of the tube through the slitted opening.

Referring to FIG. 1, there is schematically portrayed the essentials of an operation according to one method utilizing an apparatus embodiment adapted for its accomplishment. A tube die 10 of any generally conventional or otherwise desired variety is employed for the extrusion. As is customary, the die 10 is fed through an inlet conduit (not shown) with a fused or molten film-forming resinous or polymeric composition such as a film-forming polyethylene or polypropylene composition or other suitable or desirable film-forming material. The molten resinous composition is provided under suitable extrusion pressure from a supply source (not shown) such as a fluid-forwarding and metering pump or its equivalent or an extruder screw or the like apparatus. The molten composition is extruded through the generally circular ring-like or annular orifice 12 of the tube die 10 to form the freshly extruded film tube 14 of the polymeric composition. Although in most cases it is satisfactory for the tube die 10 to have a circular or at least nearly circular orifice 12, it may also be suitably formed in oval, elliptical and other forms that are only generally circular in outline.

The freshly extruded plastic film tube 14 is oriented simultaneously with extrusion by a distending gas volume 16 which is partially trapped within the tube under sufficient pressure to cause stretching of the tube. The film tube 14 is advantageously (and usually) expressed along an extrusion center line that passes longitudinally through the center of the tube die 10. The film tube 14, after being oriented by the distending gas volume 16, is withdrawn from the die 10 through a pair of nip rolls 18. Advantageously and optionally, this is subsequent to passage through a converging means, such as collapsing frame 20, which tends to converge the tube film so that it can be more efficiently grasped and handled in the nip of the rolls 18. The nip or pinch rolls 18 (or their equivalent final flattening means) may either be nondriven rolls or driven rolls, depending upon whether a mere collapsing or a forwarding and withdrawing action is desired by such installation. The compressive effect of the nip roll pairs utilized for flattening the film tube should be light enough to avoid any undesired crushing or fusion reaction on the freshly extruded tube.

The nip rolls may be driven at any desired speed to maintain the tubing under the desired tension while the tubing is in the formative mastic state thus controlling the physical properties of the tubing. Hence the peripheral speed of the nip rolls must be adjustable so that in combination with other controllable variables of the process, tubing or sheeting of the desired predetermined characteristics may be produced.

Although the film can be extruded in any direction, it is generally advantageous, as indicated in FIG. 1 to have a vertically upward (or vertically downward) center line of extrusion.

Disposed on the extrusion side of die 10 in the space enveloped by the extruded film tube 14 is a diffuser tube 22 which is provided at its upper portion with an inlet 24 adapted to receive gaseous coolant, such as air from communicating pipe 26, which in turn is supplied from a supply source (not shown). Circumferentially disposed on the outer periphery of the diffuser tube are a series of openings 28 which distribute the air introduced into the diffuser tube 22 to the interior surface of the film tube 14.

The diffuser tube can be constructed so as to oscillate or rotate with the die or alternatively, the diffuser can be non-oscillatable or non-rotatable with the die. Thus, in order to provide for oscillation or rotation, the diffuser tube 22 can be permanently attached to the die 10 and rotatably disposed in communicating pipe 26, which can be fabricated from either rigid or flexible material. On the other hand, the diffuser can be solidly fixed to communicating pipe 26 and a slip ring (not shown) located, for example, at the diffuser base 23 would allow die oscillation or rotation with a non-rotating diffuser.

In order to provide access to the gaseous coolant inlet 24 of the diffuser, the film must be slit to provide at least one slitted opening 30 of the film tube 14. Thus a film slitting means is provided which as shown in FIG. 1 is in the form of slitter knife 32 disposed below communicating pipe 26.

Although the slitting means is shown as being slitter knife 32, any means normally used in the art to slit the tube after leaving the nip rolls may be used to slit the tube before the communicating pipe 26. A single slitter knife positioned at one of the film fold locations, as shown in FIG. 1, would produce a one up centerfold construction. Two slitter knives, one at each film fold location, produces two flat sheets which can be wound separately. Two knives positioned precisely between the film fold locations would yield two centerfold constructions which also can be wound separately. It is preferred that communicating pipe 26 be aligned with slitter knife 32 so that the slit film is equally distributed on both sides of communicating pipe 26.

Although in FIG. 1 no structure is shown for supporting slitter knife 32 in the desired cutting position it will be understood that any suitable support structure can be utilized such as the bracket support structure shown in FIG. 3.

Situated interiorly of the film tube 14 are restrictor means shown as a first baffle plate 34 which is attached to the diffuser tube 22 at its lower portion in an area roughly corresponding to an area commonly referred to in the art as the "frost line". The first baffle plate 34 has a circular configuration and is merely an air restrictor which creates a greater pressure below it (in conjunction with diffuser supplied air) sufficient to form the desired film tube diameter in the primary zone. Typically, the baffle height is at the normal frost line for the film. Merely as illustrative, a normal height range for an 8 inch die and 2:1 blow-up ratio is 20-32 inches above the die face. As used herein, blow-up ratio refers to the ratio of tube diameter to die diameter. A substantially lower height improves the ease of stringup but decreases film orientation balance which results in a more splitty film. A substantially higher baffle height makes stringup of the film unacceptably difficult. Thus first baffle plate 34 divides tube 14 into a primary zone below plate 34 and a secondary zone above, as shown in FIG. 1.

Air entering the primary zone through the openings 28 follows a path generally designated by the arrows in FIG. 1 and passes between the outer periphery of first baffle plate 34 and the inner periphery of tube 14. To increase the natural exhaust from the primary zone to the secondary zone, baffle openings 36 can be provided in the baffle plate although for most operations the apparatus is operable without said openings.

Provision is made to confine the tubular film externally, if desired, by a plurality of superposed spaced rotatably contacting stabilizing rings 38 adjustably secured to frame 40. In applications where the slitting accuracy is important, several levels of rotating contacting rings may be employed. Each level of rings can be made up of four quadrants which form an approximately circular ring with substantially 360° contact with the film tube. Generally four to eight levels are required for effective damping of film tube vibrations to thereby provide slitting uniformity.

External cooling of the film tube 14 exiting die 10 can be accomplished by the strategic positioning of primary external air ring 42 at or near the die orifice 12. Primary external air ring 42 concentrically surrounds the formed film tube 14 in the primary zone and receives a gaseous coolant from a supply source (not shown) in chamber 44. The gaseous coolant leaves chamber 44 through outlet 46 whereby the exiting gaseous coolant is directed against and along the formed film tube as a stream directed in the direction of the continuously moving film tube.

To improve external film cooling, a second external cooling means such as secondary external air ring 48 can be positioned at or near the first baffle plate 34 in the secondary zone. Normally, additional external air rings contribute to a reduction in process stability by creating excessive film vibration. However, first baffle plate 34 provides effective internal stabilizing pressure which accommodates a high velocity exterior air impingement without a reduction in stability.

The features of secondary air ring 48 are similar to those of primary air ring 42 except that the stream of gaseous cooling may be substantially perpendicularly directed against the film tube, as shown in FIG. 1, or it may be directed against the film tube at an angle or in a substantially parallel direction. Thus secondary air ring 48 also concentrically surrounds the formed film tube 14 in the secondary zone and receives a gaseous coolant from a supply (not shown) in chamber 50. The gaseous coolant leaves chamber 50 through outlet 52 whereby the exiting gaseous coolant is directed against the formed film tube disposed between first baffle plate 34 and outlet 52.

FIGS. 2 and 3 illustrate modifications and/or additions which can be made to the apparatus depicted in FIG. 1. Thus referring to FIGS. 2 and 3 wherein like parts are designated by like reference numerals, it will be seen that the slitter knife 32 slits the film tube to provide slitted opening 30. In certain modes of operation, e.g. rapid rates of production, it is desirable that the film area immediately preceding the slitting area be subjected to an additional external source of cooling so that the slitter knife can make a clean cut in the advancing film. Provision is made for cooling the area which is to be slit in the advancing film, by cooling means such as cooling tube 54, which receives gaseous coolant from a source (not shown) and which is disposed through slitted opening 30. Cooling tube 54 has a portion extending downwardly generally parallel to the advancing film tube and is provided with openings 56 generally positioned adjacent film tube 14. The openings 56 distribute a stream of coolant such as cooled air to the interior surface of the film tube at an area immediately prior to the slitted area, thereby providing additional cooling of the area designated for slitting. The tube 54 is supported by bracket 58 which in turn can be affixed to frame 40.

In order to provide enhanced cooling of the film tube 12 in the secondary zone, a second gas coolant restrictor means can be provided in the secondary zone which is shown as second baffle plate 60 attached to the diffuser 22 in the secondary zone. Second baffle plate 60 is generally of the same configuration as first baffle plate 34 except that no openings are provided, thereby restricting the passage of coolant gas between the outer periphery of second baffle plate 60 and the inner periphery of the film tube. More than one baffle plate can be positioned in the secondary zone, each having a diameter the same as or less than the diameter of first baffle plate 34. By utilization of second baffle plate 60 in the secondary zone, cooling is enhanced because the coolant is now forced to pass between the small annular gap of second baffle plate(s) and the warm film. This gaseous flow arrangement is preferred to the general upward flow between the first baffle plate 34 and the exhaust through the slitted opening above the slitter knife as shown in FIG. 1. Advantageously this enhanced cooling contributes to greater control of resulting flat width. The enhanced cooling reduces the possibility of any gross and unpredictable film tube shrinkage, hence film tube circumference reduction, above the first baffle plate 34.

Figure 5:
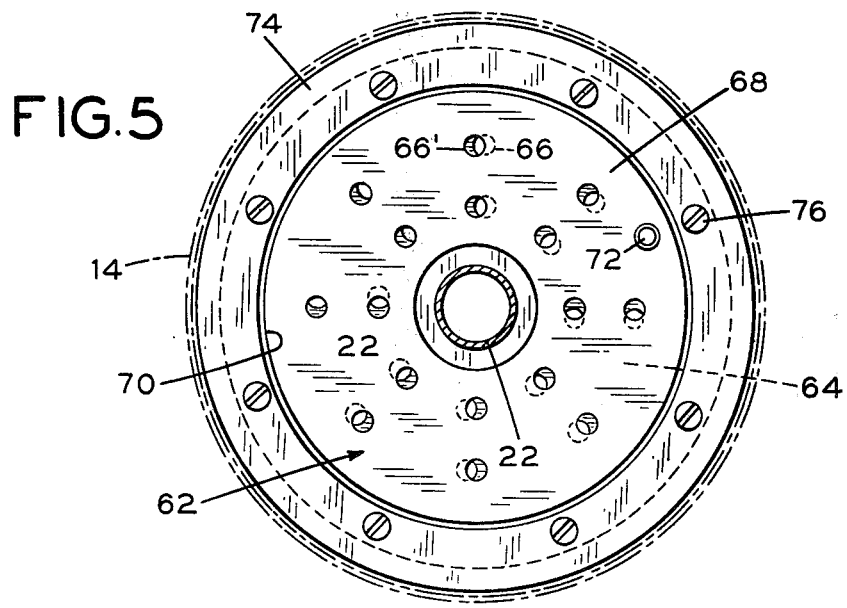
FIG. 5 is a plan view taken along line 5—5 of FIG. 4.
Figure 6:
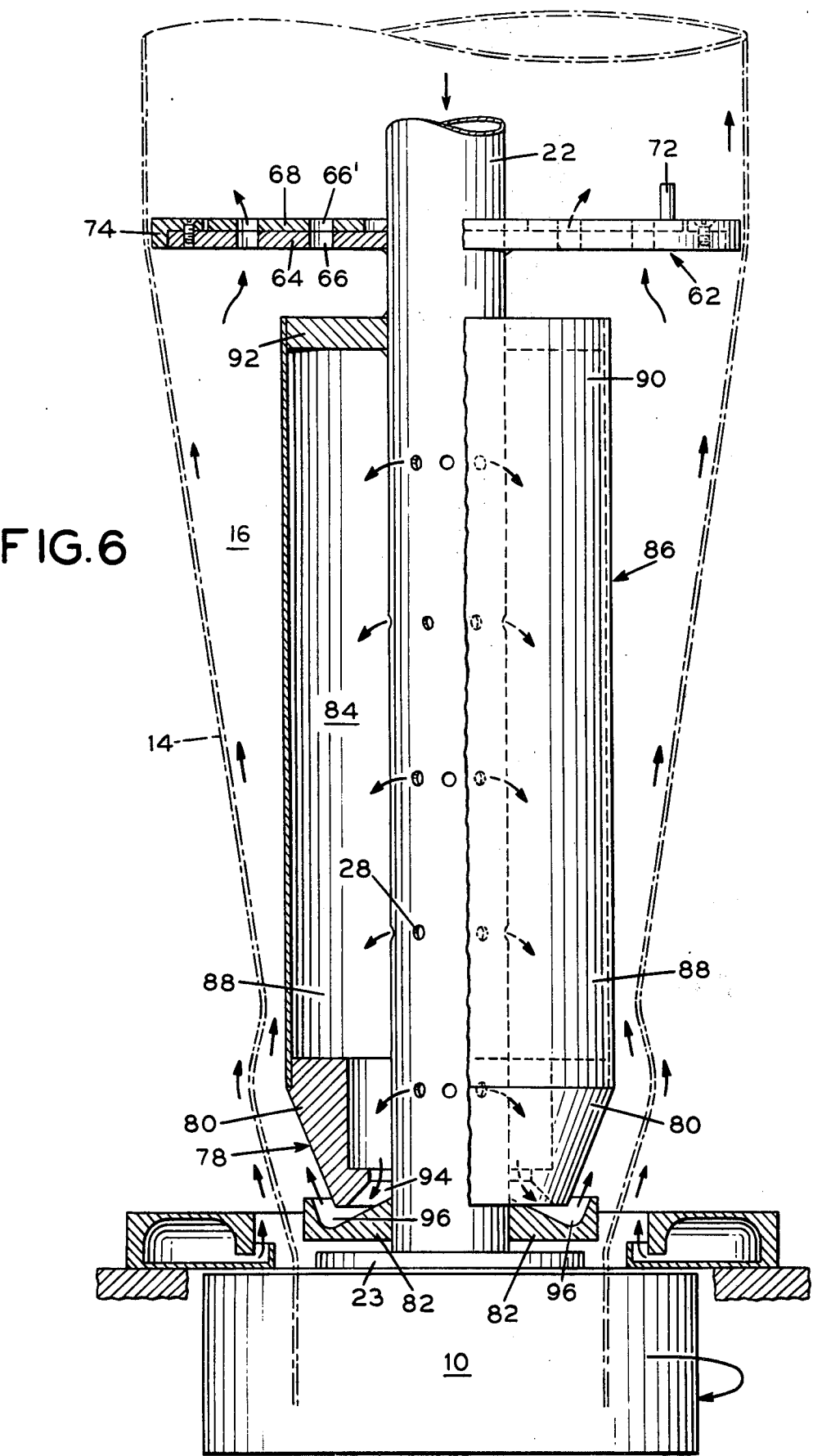
FIG. 6 is a vertical section shown partly in elevation of another embodiment of the apparatus shown in FIG. 1 and FIG. 2 and showing a lower internal air ring and plenum added in the primary zone.

In order to increase the natural exhaust from the primary zone to the secondary zone it is preferred that the restrictor means, such as first baffle plate 34, be provided with adjustable openings to allow passage of gaseous coolant through the restrictor means. A modified first baffle plate assembly 62 is depicted in FIGS. 4, 5 and 6. Thus as shown in FIGS. 4 and 5, first baffle plate assembly 62 includes a base plate 64 which is secured to diffuser tube 22 and which is provided with openings 66. Rotatably adjustably mounted on the base plate 64 is slide plate 68 which is also provided with openings 66' and which can be positioned so as to place openings 66' in registering alignment with openings 66 of base plate 64. As will be seen from FIG. 4, slide plate 68 has a smaller circumference than the circumference of base plate 64 and terminates in edge portion 70. Adjustable rotation of slide plate 68 can be accomplished by means of adjustment means such as handle 72 attached to the upper surface of slide plate 68. Attached handle 72 is positioned on slide plate 68 so that slide plate 68 can be rotated manually by a gentle push through the exterior of film tube 14. It has been found that process stability is not significantly affected by this procedure.

The first baffle plate 34 depicted in FIG. 1 has a fixed diameter which limits resulting film flatwidth to a fixed range. Thus, a different size baffle would be required for each range of resulting flatwidths. The first baffle plate assembly 62 provides for incremental flexibility by providing outer lip 74 which is detachably secured to base plate 64 by threaded elements 76. The outer lip is fabricated in various sizes adapted to alter the first diameter of the first baffle plate assembly so as to accommodate various sizes of resulting film flatwidth.

According to the mode of operation of the apparatus illustrated in FIGS. 1-4, the incoming gas coolant flowing through inlet 24 and down the diffuser tube 22 exits through the openings 28 along the diffuser tube. A portion of the gas is directed through the openings of the diffuser in the primary zone and directly impinge upon the moving film below the frost line which in some cases can contribute to film gauge non-uniformity.

FIG. 6 illustrates a modification of the primary zone which provides for a significantly higher degree of film gauge uniformity. Thus referring to FIG. 6, an internal air ring, indicated generally as 78 is mounted near the base 23 of the diffuser tube 22 and includes an upper lip 80 and a lower lip 82. Internal air ring 78 has associated therewith a plenum 84 which is in the form of a generally cylindrical tube or sheet, such as an aluminum sheet 86. The lower portion 88 of plenum 84 is attached to the upper lip 80 of internal air ring 78, and the upper portion 90 is attached to diffuser tube 22 below first baffle plate assembly 62 by means of an integral upper cover plate 92. Upper cover plate 92 is provided with a central opening that fits tightly around the diffuser tube. Plenum 84 provides an air tight enclosure for the portion of diffuser tube 22 below the first baffle plate assembly 62 and collects all the air coming from openings 28 of diffuser 22 in the primary zone and thereafter directs this air downwardly to internal air ring 78. Internal air ring 78 then distributes the air through channel 94 formed by the upper lip 80 and lower lip 82 and thence generally along the interior film surface in the primary zone as shown by the direction of the arrows.

Air in the primary zone is exhausted primarily through the gap formed between first baffle plate assembly 62 and the interior surface of the film. A small volume of air exits through the adjustable first baffle plate assembly openings 66 and 66'.

By utilizing the modified form of the apparatus in the primary zone, the gas coolant leaving internal air ring 78 is directed into the primary zone through channel outlet 96 in the direction of the advancing film tube. As mentioned previously, this mode of operation provides for increased film gauge uniformity. The modified form of the apparatus can be employed in the apparatus illustrated in FIGS. 1 and 2.

Advantageously, the gaseous coolant can be exhausted from the internal film bubble through the same slitted opening which receives the gaseous coolant.

It is advantageous for the stream of cooling gas to be at least about 300° F. (advantageously at least 100° to 400° F.) beneath the temperature of the freshly extruded film. Preferably, the temperature of the cooling fluid is about 80° F. or lower and may be as low as 35° F. or so.

The rate at which the air (or other gaseous fluid) is admitted to the internal surface of the film tube will depend somewhat on the temperature of the cooling stream and the relationship between the temperature of the cooling stream and the temperature of the extruded polymer. Ordinarily, between about 20 and 80, advantageously between 50 and 80 cubic feet of coolant (at standard conditions) per pound of polymer being extruded is employed with advantage. In this connection, particularly when polyethylene and polypropylene tubes are being manufactured, it is found to be generally advantageous for air to be utilized as the gaseous coolant and to employ it at a temperature not in excess of about 140° F. at a rate of about 55 cubic feet per pound of polymer being extruded into films of thickness between about 1.0 and 3.0 mils. Alternatively for the sake of convenience, the rate of cooling stream directed to the internal surfaces of the film tube may be expressed in terms of the lineal rate of the extrusion of the polymer. Thus, advantageously, the gaseous coolant is introduced into the film tube through the diffuser at a rate that is in the neighborhood (giving or taking, say, about 20 or so percent) of about 3.4 cubic feet per lineal foot of film tubing having a circumference of about 6.2 feet, as is based on a film speed of about 205 feet per minute and a gaseous fluid rate of about 700 cubic feet per minute.

Certain changes and modifications can be readily entered into in the practice of the present invention without substantially departing from its intended spirit and scope. Therefore, it is to be fully understood that the invention is not intended nor should it be considered to be limited or in any manner restricted by or to the delineated and preferred embodiments thereof which are contained in the foregoing description and specification. Rather, the invention is to be interpreted and construed in the light of what is set forth and defined in the hereto appended claims.

I claim:

1. An apparatus for manufacturing film from thermoplastic resinous film forming materials which comprises in cooperating combination:
   (a) a tube die adapted to extrude a film tube;
   (b) flattening means positioned a distance from the die for flattening the extruded tube;
   (c) a diffuser disposed on the discharge side of the die in the space enveloped by the extruded film tube, said diffuser having a gaseous coolant inlet disposed in the inlet portion of the diffuser, and said diffuser further having means to deliver from its peripheral surface a gaseous coolant to the interior surface of the extruded film tube;
   (d) film slitting means disposed between said inlet portion of said diffuser and said tube die for continuously slitting the extruded film to provide at least one slitted opening in the extruded film;
   (e) restrictor means associated with the diffuser defining a primary zone and a secondary zone of the extruded film and being adapted to maintain a pressure differential between the primary and secondary zone; and
   (f) means operatively associated with said gaseous coolant inlet for communicating gaseous coolant through the slitted opening to the gaseous coolant inlet whereby gaseous coolant introduced to the diffuser through the gaseous coolant inlet continuously passes through the diffuser into the primary and secondary zones and into contact with the interior surface of the tube and is continuously withdrawn through said slitted opening.

2. Apparatus according to claim 1 wherein said diffuser means for delivering gaseous coolant include peripherally disposed openings on the outer surface of said diffuser.

3. Apparatus according to claim 1 wherein said film slitting means include at least one slitter knife adapted to provide at least one slitted opening in said extruded film.

4. Apparatus according to claim 1 wherein said film slitting means is located proximate to said flattening means.

5. Apparatus according to claim 1 wherein said means for communicating gaseous coolant through said slitted opening includes a communicating conduit for delivering gaseous coolant through said slitted opening to said diffuser gaseous coolant inlet.

6. Apparatus according to claim 1 wherein said restrictor means include a first baffle plate attached to said diffuser near said tube die, said first baffle plate separating said primary zone from said secondary zone and providing a gaseous coolant passage around its periphery for passing gaseous coolant from said primary zone to said secondary zone.

7. Apparatus according to claim 6 wherein said first baffle plate includes areas defining openings providing additional gaseous coolant passages for passing gaseous coolant from said primary zone to said secondary zone.

8. Apparatus according to claim 1 further including cooling means adjacent said film slitting means for cooling the area which is to be slit in the advancing film.

9. Apparatus according to claim 8 wherein said cooling means is disposed through said slitted opening and includes a cooling tube defining a series of openings, and having a portion extending generally parallel to said area in the advancing film.

10. Apparatus according to claim 9 wherein said openings are generally positioned adjacent said film tube.

11. Apparatus according to claim 1 further including external cooling means concentrically disposed with respect to said formed film tube in said primary zone.

12. Apparatus according to claim 1 further including second restrictor means disposed in said secondary zone.

13. Apparatus according to claim 12 wherein said second restrictor means includes at least one baffle plate disposed in said seconary zone.

14. Apparatus according to claim 1 further including converging means upstream of said flattening means to converge said film tube toward said flattening means.

15. Apparatus according to claim 14 wherein said converging means is a collapsing frame.

16. Apparatus according to claim 1 further including stabilizing means positioned between said tube die and said slitting means adapted to encompass said film tube and dampen vibrations thereof.

17. Apparatus according to claim 16 wherein said stabilizing means comprises a plurality of rings.

18. Apparatus for manufacturing film from thermoplastic resinous film forming materials which comprises in cooperating combination:
   (a) a tube die adapted to extrude a film tube;
   (b) flattening means positioned a distance from said die for flattening said extruded tube;
   (c) a diffuser disposed on the discharge side of said die in the space enveloped by said extruded film tube, said diffuser having a gaseous coolant inlet disposed in the inlet portion of said diffuser, and said diffuser further having means to deliver from its peripheral surface a gaseous coolant to the interior surface of said extruded film tube;
   (d) film slitting means disposed between said inlet portion of said diffuser and said tube die for continuously slitting said extruded film to provide at least one slitted opening in said extruded film;
   (e) restrictor means associated with said diffuser defining a primary zone and a secondary zone of said extruded film and being adapted to maintain a pressure differential between said primary and secondary zone;
   (f) means operatively associated with said gaseous coolant inlet for communicating gaseous coolant through said slitted opening to said gaseous coolant inlet whereby gaseous coolant introduced to said diffuser through said gaseous coolant inlet continuously passed through said diffuser into said primary and secondary zones and into contact with said tube and is continuously withdrawn through said slitted opening; and
   (g) means for improving film gauge uniformity including an internal air ring disposed about said diffuser in said primary zone and positioned proximate said tube die.

19. Apparatus according to claim 18 wherein said internal air ring is adapted to receive gaseous coolant from said diffuser.

20. Apparatus according to claim 19 wherein said internal air ring includes a plenum surrounding said diffuser.

21. Apparatus according to claim 18 wherein said internal air ring is adapted to distribute coolant to said primary zone in the direction of said advancing film tube.

22. Apparatus according to claim 18 wherein said restrictor means includes a first baffle plate assembly having a base plate secured to said diffuser tube and a slide plate rotatably mounted thereon both of said base plate and slide plate being provided with openings whereby when said openings are in alignment said gaseous coolant passes from said primary zone through said openings into said secondary zone.

23. Apparatus according to claim 22 further including means operatively associated with said first baffle plate assembly for varying the periphery of said first baffle plate assembly.

24. Apparatus according to claim 23 wherein said means for varying the periphery of said first baffle plate assembly include means for detachably securing an outer lip to said base plate.

25. Apparatus according to claim 22 including means operatively associated with said slide plate for rotating said slide plate with respect to said base plate.

26. Apparatus according to claim 25 wherein said means for rotating said slide plate include a handle secured to said slide plate.

27. Apparatus for manufacturing film from thermoplastic resinous film forming materials which comprises in cooperating combination:
(a) a tube die adapted to extrude a film tube;
(b) flattening means positioned a distance from said die for flattening said extruded tube;
(c) a diffuser disposed on the discharge side of said die in the space enveloped by said extruded film tube, said diffuser having a gaseous coolant inlet disposed in the inlet portion of said diffuser, and said diffuser having means to deliver from its peripheral surface a gaseous coolant to the interior surface of said extruded film tube, said means including circumferentially disposed areas defining openings on the outer surface of said diffuser;
(d) film slitting means disposed between said inlet portion of said diffuser and said tube die for continuously slitting said extruded film including at least one slitter knife adapted to provide at least one slitted opening in said extruded film;
(e) restrictor means assocated with said diffuser defining a primary zone and a secondary zone of said extruded film and being adapted to maintain a pressure differential between said primary and secondary zone; and
(f) a communicating conduit operatively associated with said gaseous coolant inlet for communicating gaseous coolant through said slitted opening to said gaseous coolant inlet whereby gaseous coolant introduced to said diffuser through said gaseous coolant inlet continuously passes through said diffuser into said primary and secondary zone and into contact with said extruded tube and is continuously withdrawn through said slitted opening.

28. Apparatus according to claim 27 wherein said restrictor means include a first baffle plate attached to the lower portion of said diffuser, said first baffle plate separating said primary zone from said secondary zone and providing a gas coolant passage around its periphery from said primary zone to said secondary zone.

29. Apparatus according to claim 28 wherein said first baffle plate includes areas defining openings providing additional gas coolant passages for passing coolant from said primary zone to said secondary zone.

30. Apparatus according to claim 27 further including cooling means adjacent said film slitting means for cooling the area which is to be slit in the advancing film.

31. Apparatus according to claim 30 wherein said cooling means is disposed through said slitted opening and includes a cooling tube defining a series of openings for discharging a coolant against the surface of said advancing film to be slit, said cooling tube having a portion extending generally parallel to said area in the advancing film.

32. Apparatus according to claim 31 wherein said openings are generally positioned adjacent said film tube.

33. Apparatus according to claim 27 further including external cooling means concentrically disposed with respect to said formed film tube in said primary zone.

34. Apparatus according to claim 33 further including second restrictor zone disposed in said secondary zone.

35. Apparatus according to claim 34 wherein said second restrictor means includes at least one baffle plate disposed in said secondary zone.

36. Apparatus according to claim 35 further including converging means upstream of said flattening means to converge said film tube toward said flattening means.

37. Apparatus according to claim 36 wherein said converging means is a collapsing frame.

* * * * *